United States Patent [19]
Dalke et al.

[11] Patent Number: 5,519,746
[45] Date of Patent: May 21, 1996

[54] LARGE BWR FUEL CHANNEL DESIGN

[75] Inventors: Charles A. Dalke, San Jose; Charles W. Dillmann, Morgan Hill; Charles W. Relf, Fremont, all of Calif.

[73] Assignee: General Electric Company, Schenectady, N.Y.

[21] Appl. No.: 348,155

[22] Filed: Nov. 28, 1994

[51] Int. Cl.$^6$ .................................................. G21C 3/32
[52] U.S. Cl. .......................... 376/434; 376/440; 376/438; 376/444; 376/448
[58] Field of Search .................... 376/434, 440, 376/438, 444, 448; 976/DIG. 156, DIG. 158

[56] References Cited

U.S. PATENT DOCUMENTS

| | | | |
|---|---|---|---|
| 4,123,327 | 10/1978 | Sugisaki et al. | 376/440 |
| 4,348,355 | 9/1982 | Nylund | 376/434 |
| 4,454,093 | 6/1984 | Nylund et al. | 376/282 |
| 4,585,614 | 4/1986 | Helmersson | 376/434 |
| 4,588,550 | 5/1986 | Blomstrand et al. | 376/438 |
| 4,659,543 | 4/1987 | Lui | 376/444 |
| 4,707,328 | 11/1987 | Arbink et al. | 376/446 |
| 4,740,350 | 4/1988 | Taleyarkhan | 376/441 |
| 4,749,547 | 6/1988 | Blomstrand et al. | 376/444 |
| 4,759,912 | 7/1988 | Taleyarkhan | 376/435 |
| 4,795,608 | 1/1989 | Nylund | 376/444 |
| 5,002,725 | 3/1991 | Lettau et al. | 376/444 |
| 5,080,858 | 1/1992 | Nylund | 376/443 |
| 5,089,220 | 2/1992 | Nylund | 376/439 |
| 5,096,660 | 3/1992 | Hembjer et al. | 376/438 |
| 5,267,286 | 11/1993 | Hirukawa | 376/353 |

*Primary Examiner*—Donald P. Walsh
*Assistant Examiner*—Meena Chelliah
*Attorney, Agent, or Firm*—Nixon & Vanderhye

[57] ABSTRACT

A fuel bundle assembly for a boiling water nuclear reactor includes an open ended tubular channel subdivided into four quadrants by at least two interior partitions, each quadrant having a sub-fuel bundle assembly having a plurality of fuel rods extending between upper and lower tie plates. An inter-bundle support plate receives a lower end of the channel and has four flow openings at an upper end thereof, such that the lower tie plate of each sub-fuel bundle supported in a respective one of the openings in the support plate. In one embodiment, the sub-fuel bundles within a channel are separated by a cruciform shaped coolant passage. In a second embodiment, the cruciform coolant passage is omitted to thus provide a homogeneous sub-fuel bundle configuration.

20 Claims, 9 Drawing Sheets

LARGE BWR FUEL CHANNEL DESIGN

TECHNICAL FIELD

This invention relates to the fuel bundles for boiling water nuclear reactors, and more particularly to an improved and enlarged fuel bundle channel design.

BACKGROUND

A Boiling Water Reactor (BWR) generates steam in its core. This core is composed of an array of side-by-side, vertically upstanding square sectioned fuel bundles. These fuel bundles divide the core region of the reactor into the so-called core bypass region exterior of the fuel bundles, and the core region interior of the fuel bundles. The flow region interior of the fuel bundles is at a higher pressure than the bypass region. Typically, water is forced to circulate through the fuel bundles by pumping. The flow region exterior of the fuel bundles contains non-boiling water and is used to provide increased presence of water for the moderation of high speed neutrons to low speed neutrons so that the chain reaction in the boiling water reactor can continue.

Fuel bundle construction can be summarized in a simplified format sufficient for the understanding of this invention. A fuel bundle consists of a group of fuel rods between an upper tie-plate and lower tie-plate. The upper tie-plate and the lower tie-plate and the fuel rods extending therebetween are provided with a polygon section, which section is preferably square. This section is surrounded by a water impervious channel which forms a water tight boundary from the lower tie-plate to the upper tie-plate.

In a BWR, the fuel channels perform three distinct and separate functions. First, the channels form individual coolant cells in which the fuel rods or fuel assemblies are located, thus separating boiling coolant from moderator coolant within the core region. Second, adjacent channel sides form the control rod blade guiding annulus. Third, the channels position and laterally support the fuel assemblies.

BWR fuel assembly size has remained basically the same for approximately three decades. A typical size is 5.518 by 5.518 inches square by 166.9 inches long. Initially, bundle size was determined by the capability of the reactivity control system to keep the core in a state of cold shut-down with sufficient reactivity margin, considering one control rod projecting out of the core. This size was appropriate considering the known D-lattice, C-lattice and N-lattice designs in which one cruciform control blade is inserted between every tour bundles in the core. More recent advances in the use of burnable poisons and axial enrichment variation have made it possible to increase the fuel assembly size beyond the typical BWR size. Furthermore, by designing the core such that two control blades are adjacent to two opposite corners of the fuel assembly during shut-down, the bundle size can be increased even more from the viewpoint of reactivity control. This arrangement is called the K-lattice core. The bundle width for this application is approximately 6.375 inches or slightly bigger than the bundle width for other lattices as noted above.

Recently, there has been interest in further increasing the size of the BWR fuel bundle for future BWR plant designs. The motivation for increasing the size is to reduce the total number of control rod drives (CRD's) required for reactivity control, and to reduce the amount of fuel handling and shuffling during the refueling outage. Bundle widths as much as two times the typical existing BWR bundle pitch are under consideration. The invention here explains how such an enlarged bundle can be constructed so that fuel design issues including channel bulge and availability of two phase flow thermal-hydraulic test data are addressed.

DISCLOSURE OF THE INVENTION

In accordance with this invention, a large fuel channel design is provided which consists of a large channel with inner channels or cross ties which divide the large channel into four quadrants. Each quadrant serves as a cell for a sub-fuel bundle. Each sub-fuel bundle is similar in size to a traditional BWR fuel bundle. By arranging four sub-fuel bundles within a single channel, and by arranging four of these enlarged channels about each CRD, it will be appreciated that the total number of required CRD's can be reduced significantly.

The lower section of the large fuel channel has an attached inter-bundle fuel support to vertically hold the sub-fuel bundles. Thus, each channel and inter-bundle fuel support serves as a "basket" for the four sub-fuel bundles.

Two embodiments of the invention are described herein, each varying only slightly in mechanical design from the other. One approach is referred to as the "water cross type bundle approach" while the other is referred to as the "homogeneous bundle approach".

The water cross type bundle approach includes a large channel divided by inner channel pans or cross ties which divide the channel into four discrete quadrants. These inner channel parts or cross ties provide or define a cruciform passage centrally located vis-a-vis the channel (isolated from the sub-fuel bundles), and through which coolant is adapted to flow. One feature of this water cross type bundle is that water gaps that are maintained on all four sides of each sub-bundle similar to existing BWR lattice configurations in the core. Specifically, the water cross separates the sub-fuel bundles from each other, axially along the entire length of the channel. At the same time, the spacing between adjacent large bundles within the core is the same as the spacing between the sub-bundles of each large bundle, as defined by the water cross. It is this arrangement that provides substantially equal cooling flow along all four sides of each sub-fuel bundle. In addition, the arrangement of CRD's between the various large bundles is such that opposite corners of each large bundle are bracketed by a pair of CRD blades or wings.

Four inlet nozzles are provided (one for each sub-bundle) in the inter-bundle support plate, simplified with coolant via a common inlet opening. This first embodiment has the ability to orifice each sub-bundle separately in order to assure good thermal-hydraulic-nuclear stability.

The homogeneous type bundle has no water gaps and no water cross within its lattice structure, and instead is a "homogeneous" lattice of fuel and water rods. For structural support of the large fuel channel, however, relatively thin, vented partitions are used to provide strength to the channel, and to again divide the bundle into four quadrants or cells for the sub-bundles. Flow communication holes in the partitions provide pressure equalization among the sub-bundles to assure good stability characteristics. The partitions also assure good critical power ratio margin for the large bundle based on availability of thermal analysis basis data.

Thus, in accordance with a broad aspect of the invention, there is provided a fuel bundle assembly for a boiling water nuclear reactor comprising an open ended tubular channel subdivided into four quadrants by at least two interior partitions, each quadrant having a sub-fuel bundle assembly comprising a plurality of fuel rods extending between upper and lower tie plates; an inter-bundle support plate receiving a lower end of the channel and having four flow openings at an upper end thereof, the lower tie plate of the sub-fuel bundle supported in a respective on of the openings.

The channel design described herein reduces the time required for fuel handling by allowing roughly four times more fuel to be moved per lift compared to current BWR fuel channel designs. In addition to improving fuel handling, the large channel design has an increased load carrying capability under seismic events, and is structurally more resistant to channel bow and bulge deformation. It will also be appreciated that the new large channel design in accordance with this invention supports the three distinct and separate functions of conventional channels, discussed hereinabove.

Advantages of the invention in addition to those described above, will become apparent from the detailed description which follows.

BEST MODE FOR CARRYING OUT THE INVENTION

Figure 1:
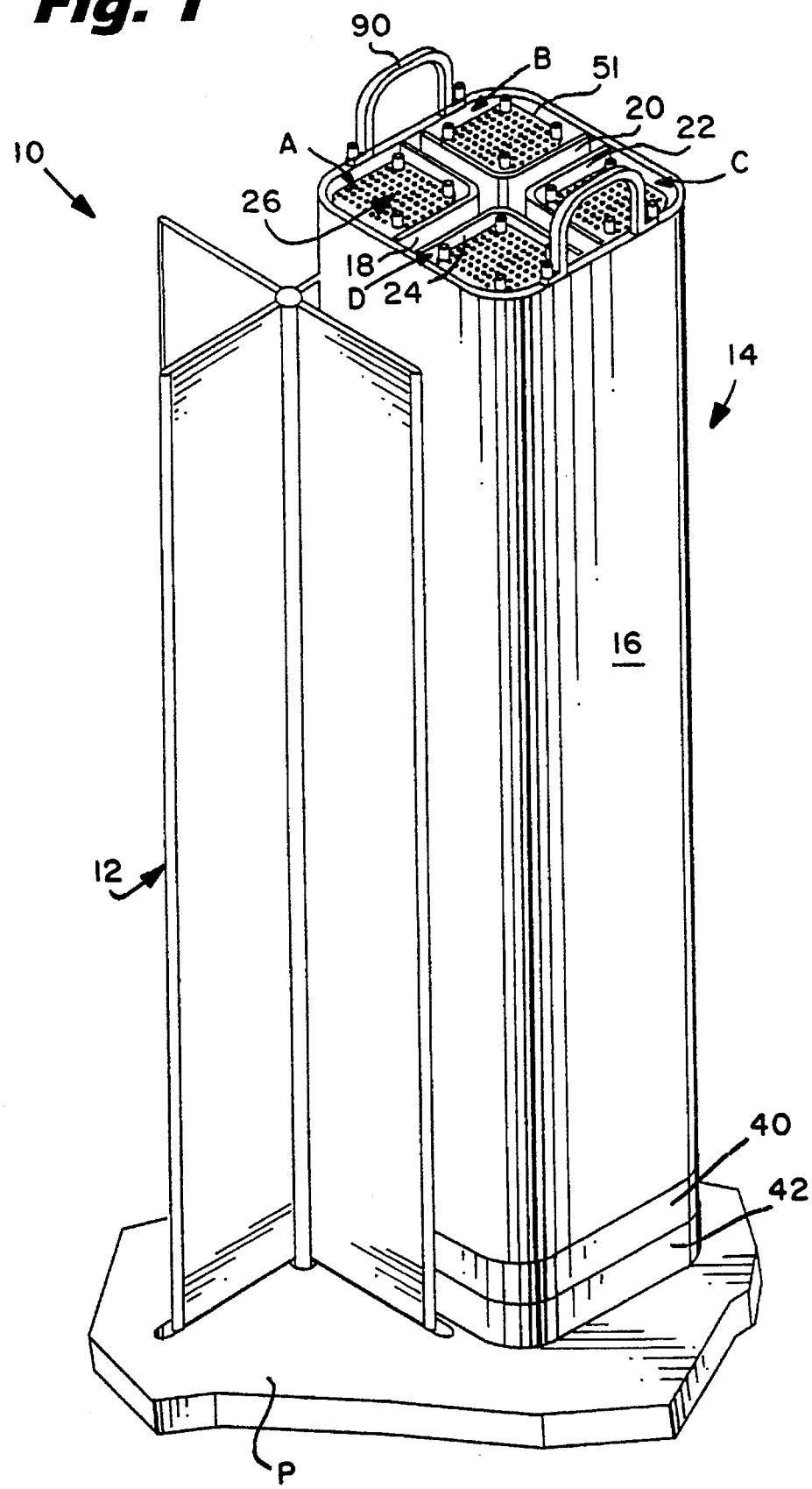
FIG. 1 is a partial perspective of a boiling water reactor core illustrating a large channel for a water cross type bundle in accordance with a first embodiment of the invention, shown in associated with a control rod drive.

With reference to FIG. 1, part of a Boiling Water Reactor (BWR) core 10 is shown, including a cruciform Control Rod Drive (CRD) 12 projecting upwardly through a core plate P. The CRD 12 is centrally located relative to four fuel rod bundle assemblies, only one of which is shown at 14 in FIG. 1, but see also FIG. 2.

The assembly 14 includes a large, open-ended tubular channel 16 provided with inner channels or cross ties 18, 20, 22 and 24 which divide the channel 16 into four corresponding quadrants A, B, C and D. The large channel 16 is substantially square in section, but with rounded corners. Each quadrant serves as a cell for a sub-fuel bundle 26 of otherwise conventional BWR bundle construction (including, in the embodiment shown, 64 fuel rods including 6 which also serve as tie rods), except as noted below. Thus, unlike the conventional arrangement where each bundle 26 would have its own fuel channel, the present invention utilizes a single large channel 16 to embrace as many as four sub-fuel bundles 26. Thus, it will be appreciated that the substantially square channel 16 may have side dimensions about twice that of the conventional channel.

In this first embodiment, also referred to as a water cross type bundle, the inner cross ties 18, 20, 22 and 24 are arranged to provide a cruciform moderator passage (or water cross) 28 between the sub-fuel bundles 26, and specifically between the cross ties 18, 20, 22 and 24, with moderator introduced into the passage 28 via ports 30 located in the inter-bundle fuel support described below. Each cruciform passage 28 is provided with a plurality of reinforcements 29 in each section of the passage, and arranged at vertically spaced intervals along the length of the channel. The reinforcements 29 and cross ties 18, 20, 22 and 24 serve to reinforce the channel 16 and thus resist undesirable channel bowing or bulging.

Figure 4:
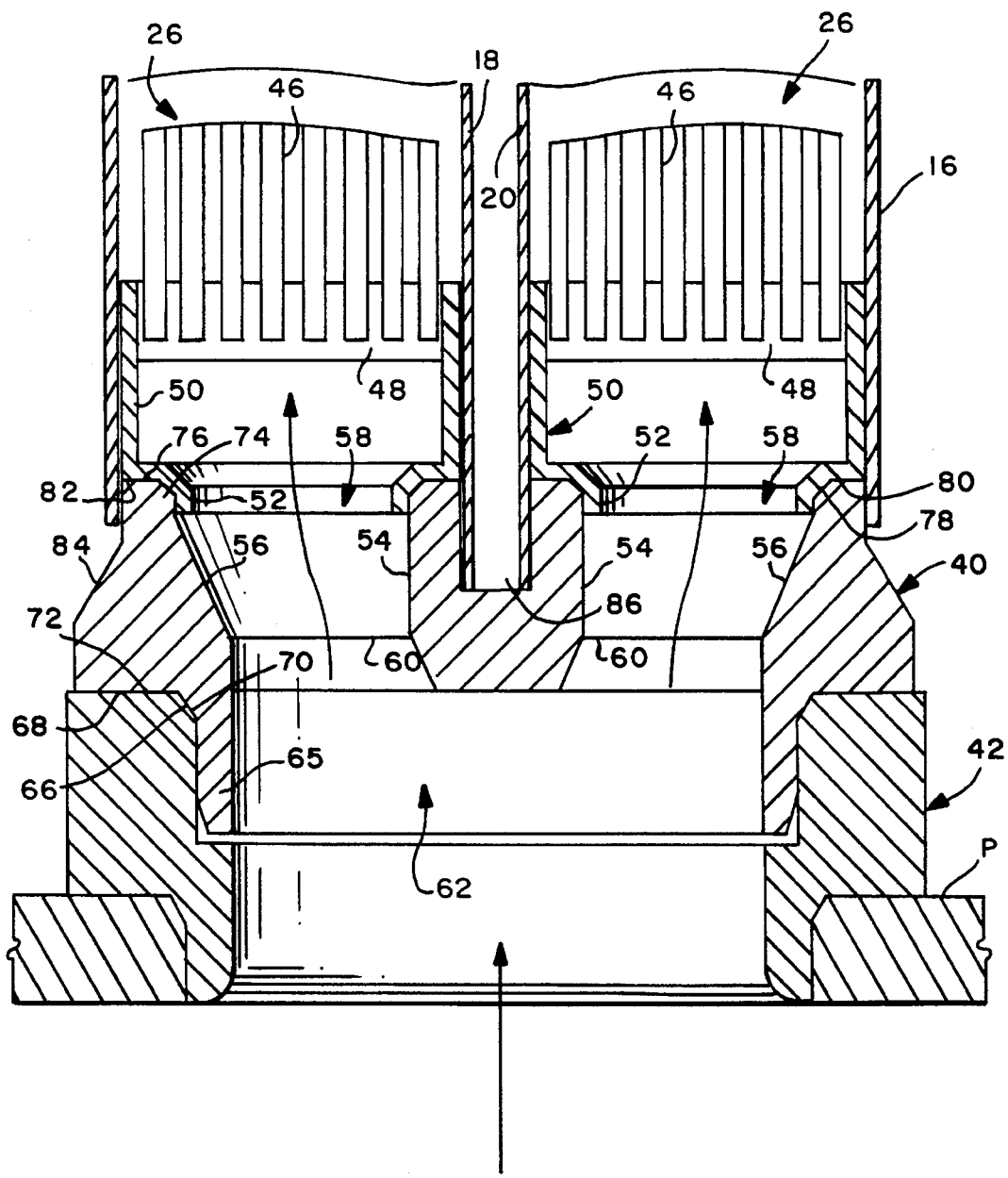
FIG. 4 is a partial side section illustrating inter-bundle fuel support for the large fuel bundle in accordance with the first embodiment of the invention.

It should be noted that in the arrangement shown in FIG. 4, four large channels 16 and associated group of four sub-fuel bundle assemblies 26 are shown in place about the CRD 12 which includes four wings or blades in mutually perpendicular pairs. Additional CRD's are shown at 32, 34, 36 and 38 to illustrate the manner in which two control rod blades are located adjacent two opposite corners of each large channel 16. At the same time, it may be seen that each sub-fuel bundle is cooled by in-channel flow on two sides and out-of-channel flow on the remaining two sides. By maintaining spacing between adjacent channels 16 substantially equal to the spacing between the inner cross ties 18, 20, 22 and 24, the flow gap or space on all four sides of each sub-fuel bundle is essentially the same, similar to existing BWR lattice configurations.

Figure 2:
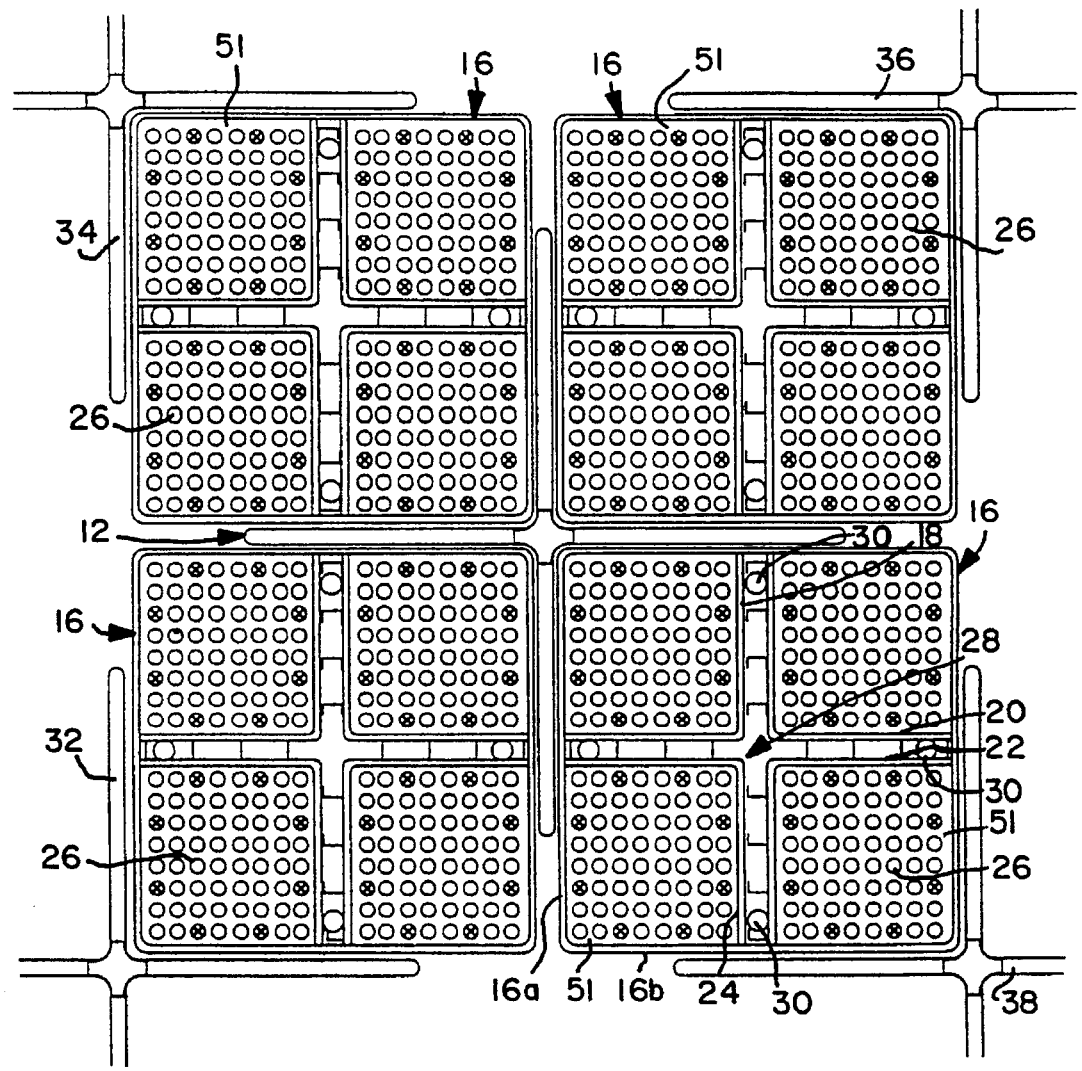
FIG. 2 is a partial plan of four large channels and associated sub-fuel bundles of the type shown in FIG. 1, along with adjacent control rod drives.
Figure 3:
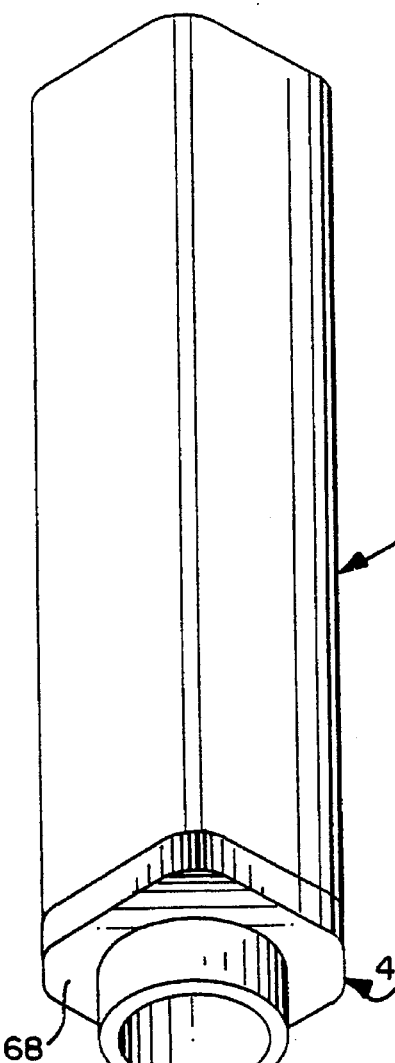
FIG. 3 is a partial perspective of a large fuel bundle channel with an inter-bundle fuel support at its lower end in accordance with the first embodiment of the invention.
Figure 6:
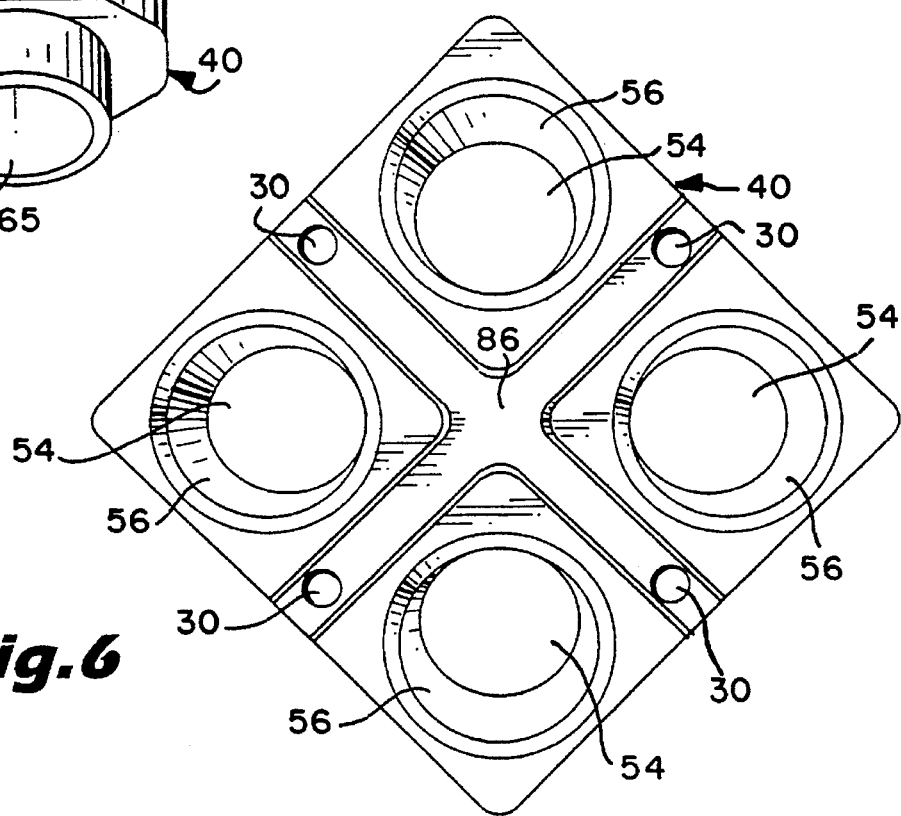
FIG. 6 is a plan view of the inter-bundle fuel support illustrated in FIG. 4.

Turning now to FIG. 3, it will be seen that the large channel 16 is supported on an inter-bundle fuel support plate 40 which, in turn, is supported on a cup 42 (FIG. 1). The latter is fixed to the core plate P. With regard to FIG. 4, it is initially apparent that each sub-fuel bundle 26 comprises a plurality of fuel rods 46 supported at their lower ends by a fuel rod supporting grid 48 of a lower tie plate assembly 50. The fuel rods 46 are secured at their upper ends by an upper tie plate 51 (see FIGS. 1 and 2). The lower inlet nozzle portion 52 of each lower tie plate 50 is circular in shape, and is seated within a corresponding opening 54 in the inter-bundle support plate 40. With reference also to FIG. 6, it may be seen that each plate 40 is provided with four such openings 54 to accommodate the lower tie plates of the four sub-fuel bundles supported on each plate 40. Plate 40 is otherwise of generally square shape and of a cross sectional size similar to the large channel 16.

The four openings 54 in plate 40 each taper downwardly and inwardly along surfaces 56 such that the vertical centerlines of the openings 54 are offset relative to the vertical centerline of a common inlet opening 62, such that coolant flow is caused to change direction as it flows upwardly through the plate 40 into the individual sub-fuel bundles 26. Upstream of the openings 54, a common inlet opening 62 as defined by the mounting sleeve portion 65 of the plate 40 supplies liquid coolant to the four openings 54. This sleeve portion 64 is formed exteriorly with a tapered annular seating surface at 66 and a horizontally oriented seating flange 68 which engages complementary surfaces 70, 72, respectively, on the support cup 42, fixed to the core plate P and seated within the plate P in a similar manner.

The openings 54 of the support plate 40 are surrounded by tapered seating surfaces 74 and a horizontal top surface 76 upon which mating surfaces 78, 80, respectively, of the lower tie plates 50 are seated. The large channel 16 is received over the upper edge 82 of peripheral side wall 84 of the support plate 40, as best seen in FIG. 4.

Figure 5:
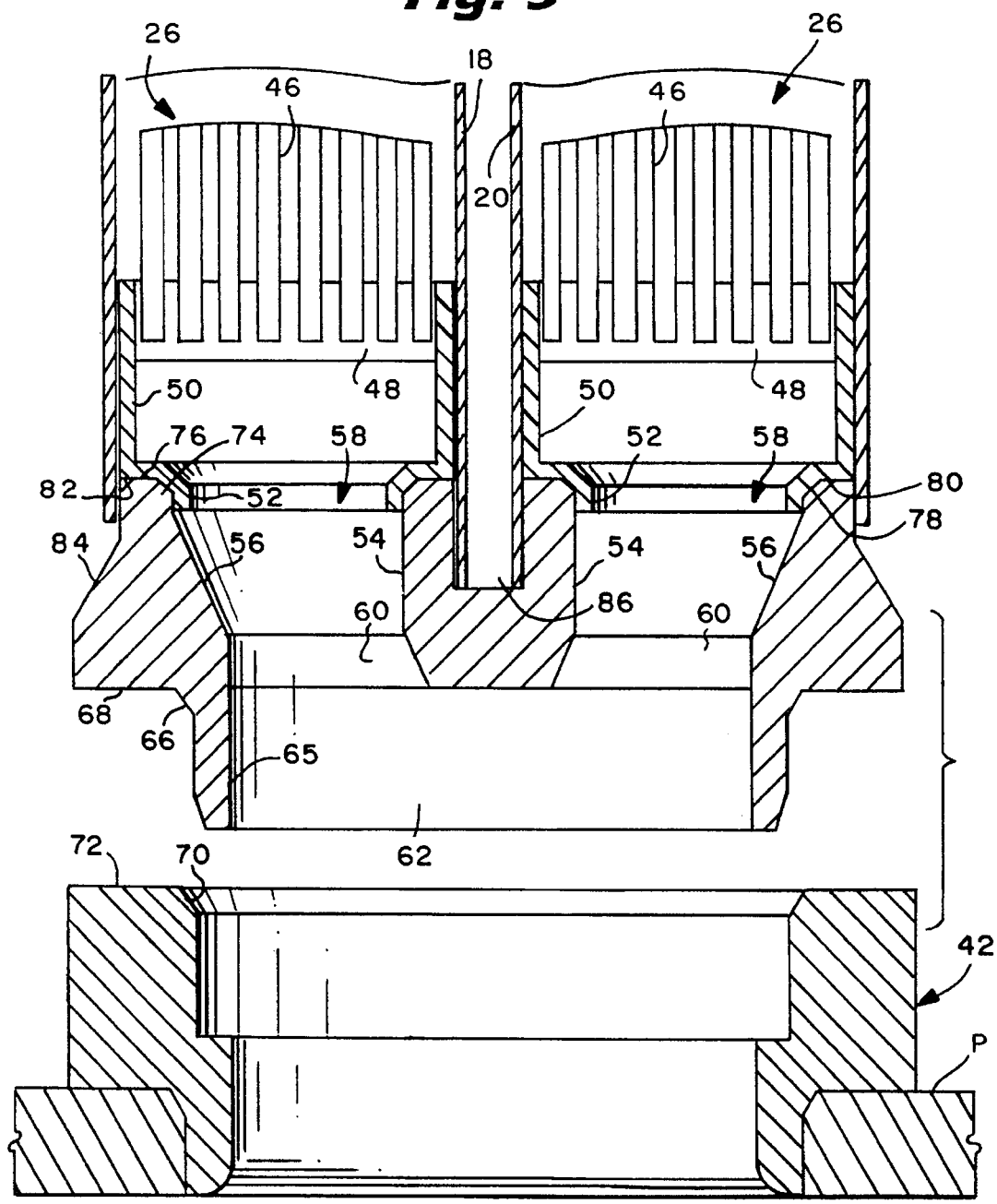
FIG. 5 is a partial side section similar to FIG. 4 but illustrating the manner in which the large fuel bundle can be removed from the inter-bundle fuel support.
Figure 7:
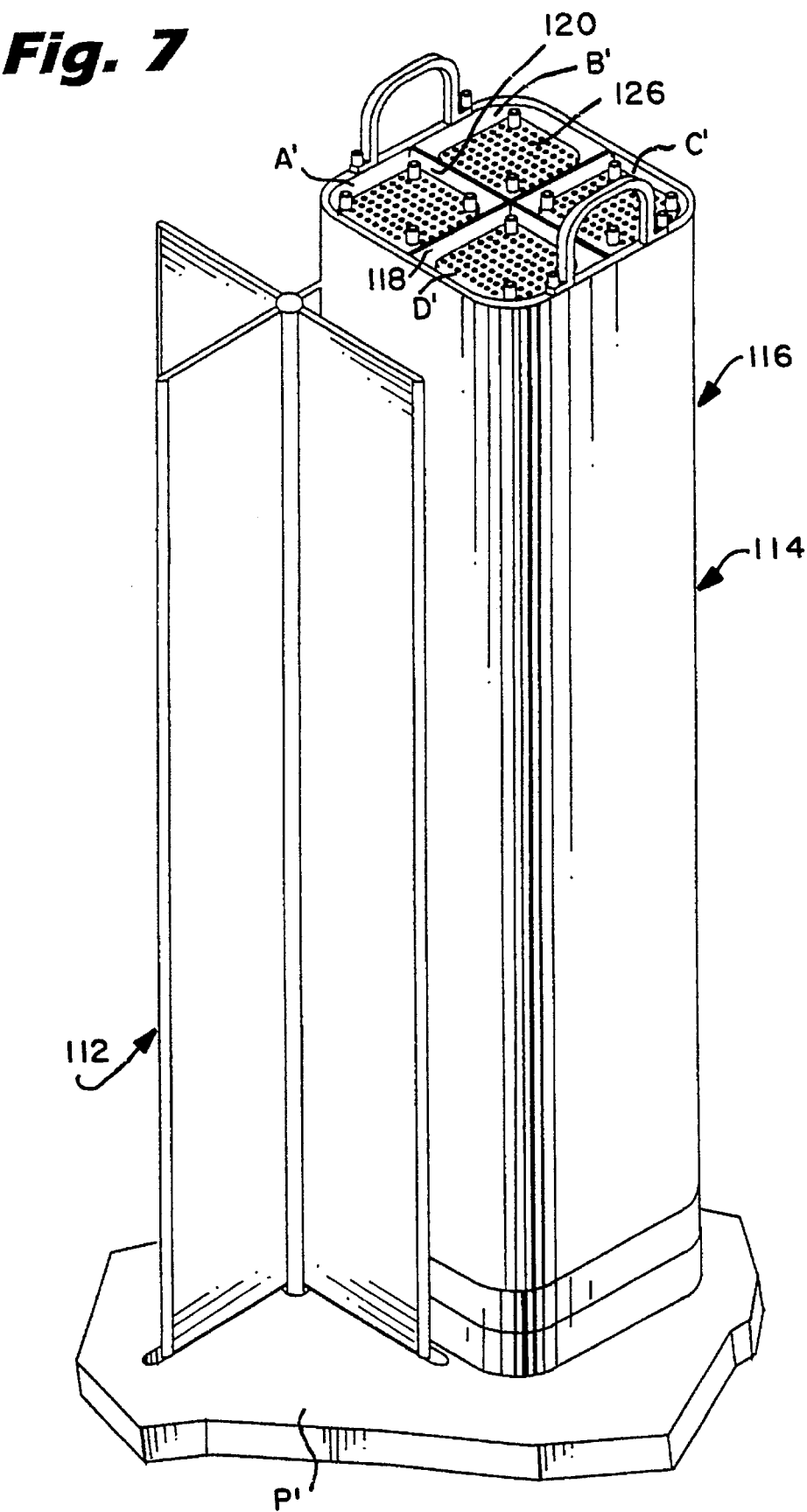
FIG. 7 is a partial perspective of a boiling water reactor core showing a large fuel channel enclosing a homogeneous type sub-fuel bundle in accordance with a second embodiment of the invention.
Figure 8:
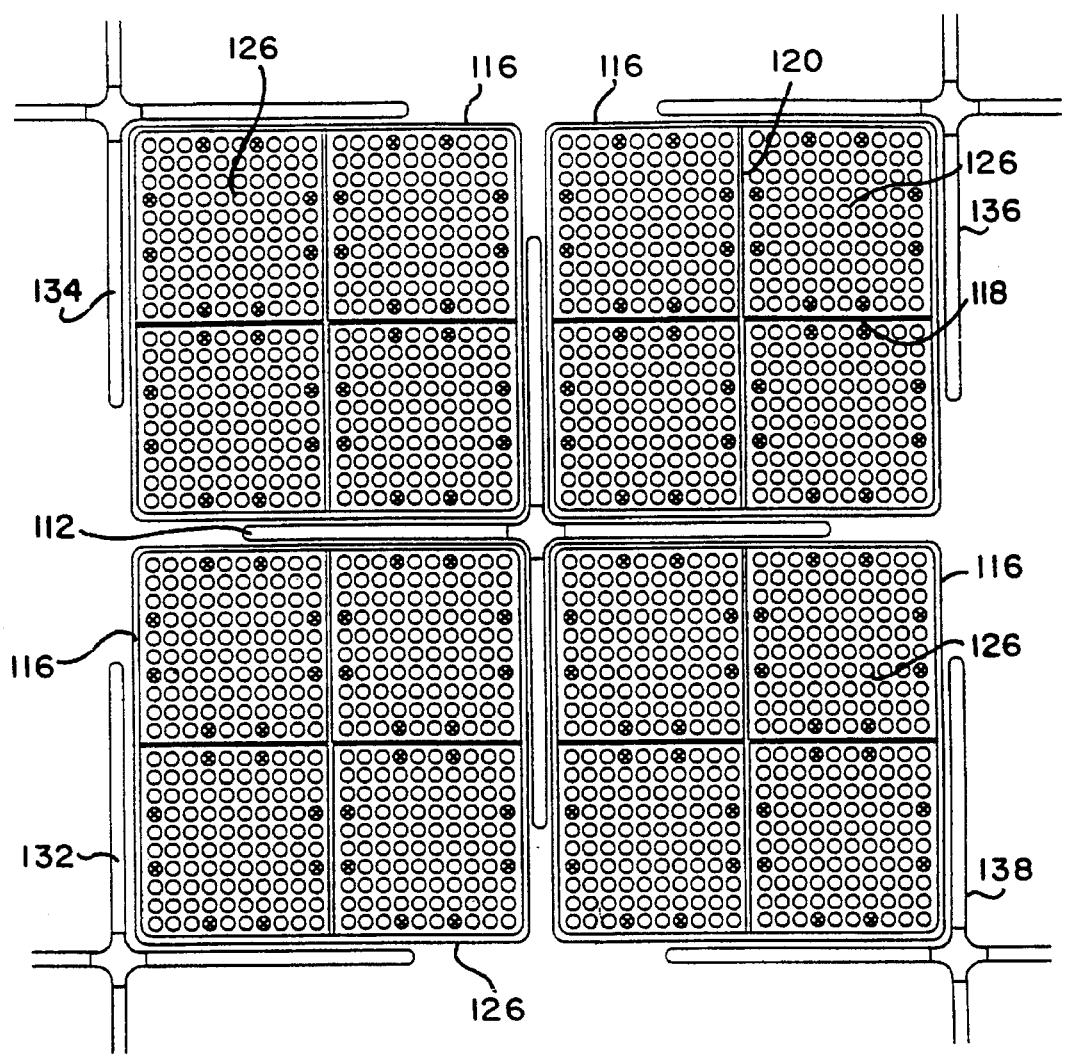
FIG. 8 is a partial plan of four large channels and associated sub-fuel bundles of the type shown in FIG. 7, along with adjacent control rod drives.

With reference also to FIGS. 4–6, the top of the support plate is also formed with a cruciform groove or slot 86 which receives the inner channels or cross ties 18, 20, 22 and 24 and through which coolant is supplied via ports 30 (FIG. 2).

Utilizing handles 90 secured to the upper end of the large channel 16 as shown in FIG. 1, the entire sub-fuel bundle assembly 14 including channel 16 and four sub-fuel bundle assemblies 26 can be lifted from the support cup 44 (as shown in FIG. 5) during refuel or repair procedures.

Turning now to FIGS. 7–11, a second embodiment of the invention is illustrated wherein a homogeneous type bundle approach is employed. In this embodiment, like reference numerals, but with the prefix "1" added, are used to designate components corresponding to those in the first described embodiment. A prime (') is used for corresponding alpha characters. In the homgeneous type bundle 114, no water cross 28 is provided between the individual sub-fuel bundles 126 within the large channel 116. Rather, a pair of mutually perpendicular, vented partitions 118, 120 (which may be welded together as a cruciform unit prior to insertion within the channel 116) are utilized between the sub-fuel bundles 126 to provide structural support to the channel. Thus, while the vented partitions 118, 120 divide the bundle into four quadrants A', B', C' and D', no water cross is provided. Rather, the partitions 118, 120 are each formed with flow communication holes (preferably in the form of a regular array or pattern of holes 92 (see FIG. 9) along the entire length of each partition 118 and 120 in the nature of a perforated sheet) to provide pressure equalization among the sub-fuel bundles 126 and thus assure good stability characteristics. These cross ties or partitions 118, 120 also assure good critical power ratio margin for the large bundle, based on availability of thermal analysis basis data.

Figure 9:
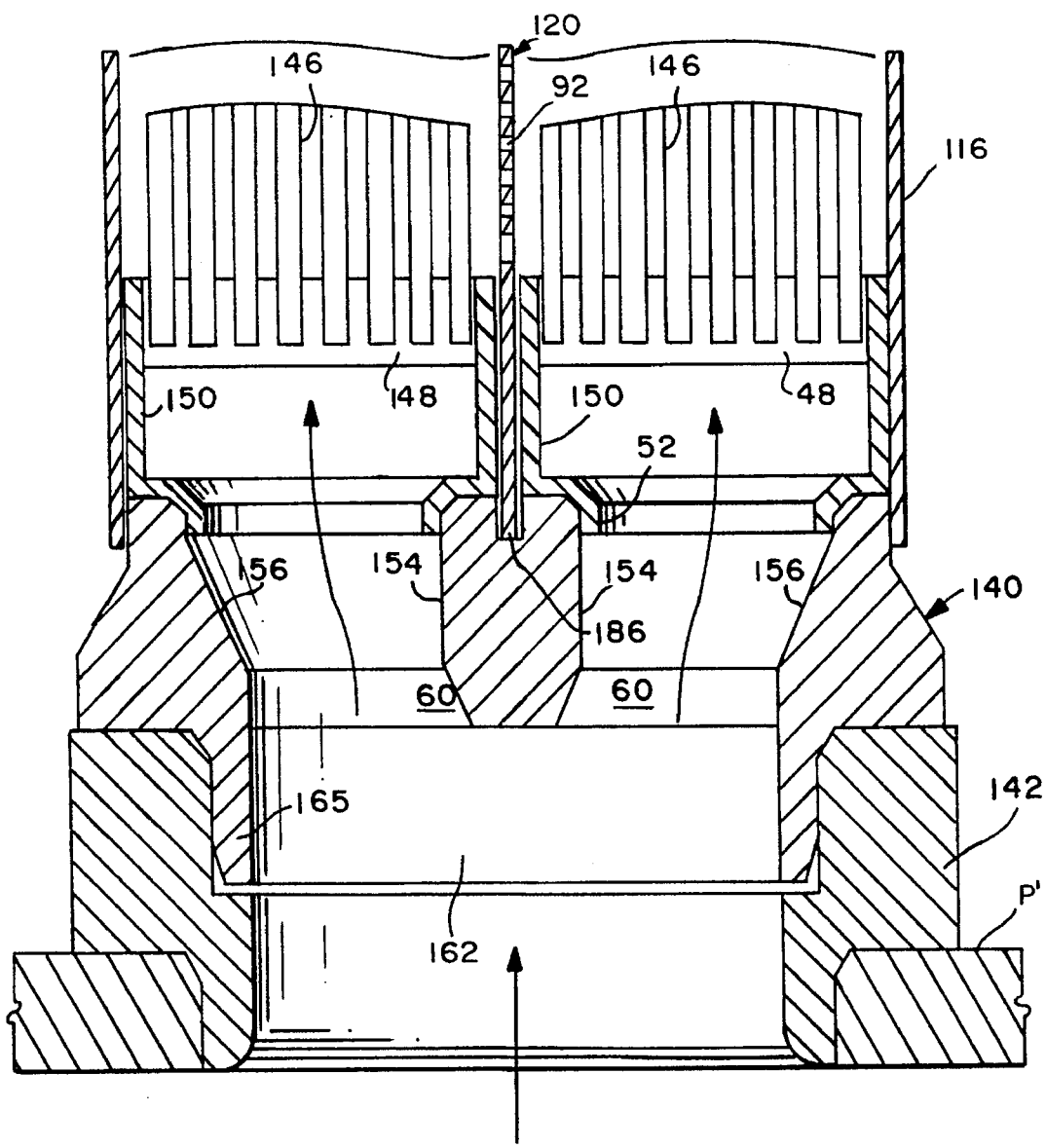
FIG. 9 is a partial side section illustrating the inter-bundle fuel support for the large fuel bundle in accordance with the second embodiment of the invention.
Figure 10:
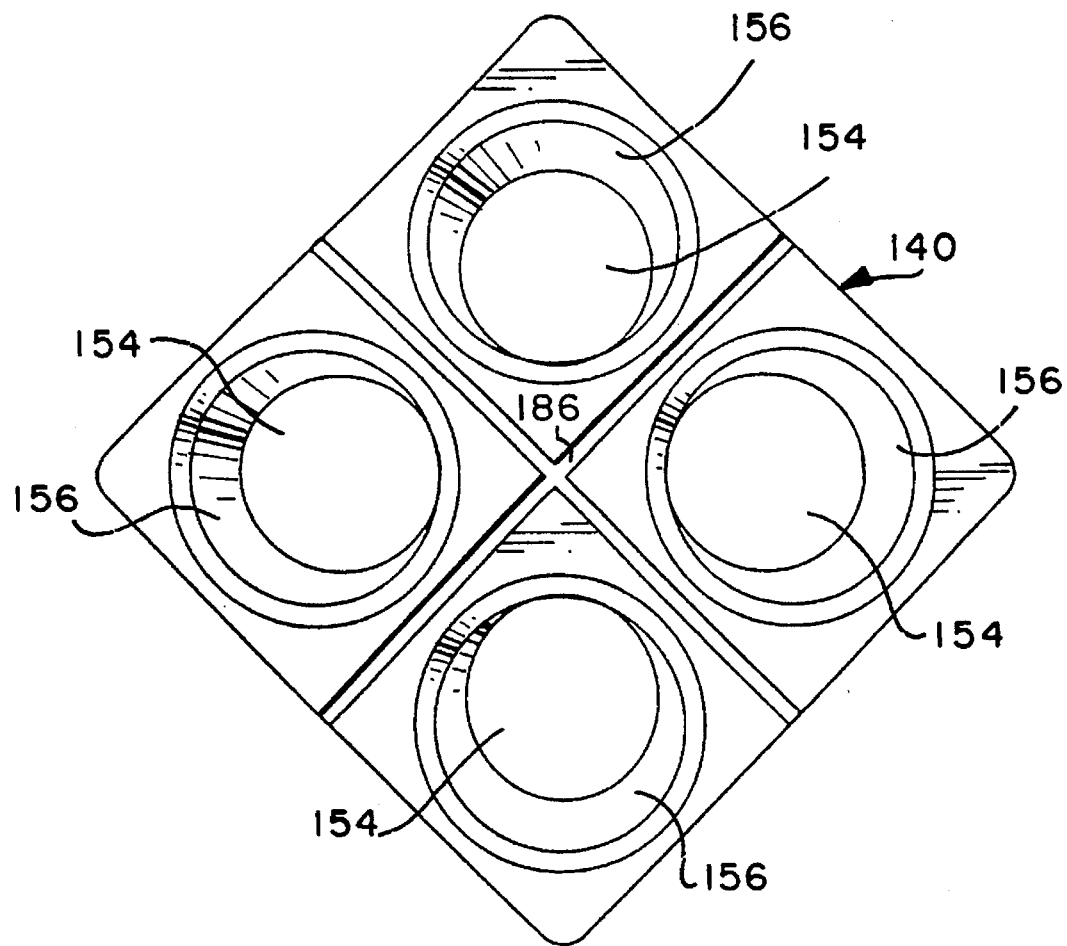
FIG. 10 is a partial side section similar to FIG. 9 but illustrating the manner in which the large fuel bundle can be removed from the inter-bundle support.

With reference to FIGS. 9 and 10, it will be seen that a cruciform groove or slot 186 is provided in the support plate 140 for the vented partitions 118, 120. Otherwise, the construction of the plate 140 and support cup 144 is similar to that previously described in connection with the first embodiment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle assembly for a boiling water nuclear reactor comprising an open ended tubular channel subdivided into tour quadrants by at least two interior partitions, each quadrant having a sub-fuel bundle assembly enclosed on two adjacent sides of said open ended tubular channel and on two remaining adjacent sides by said interior partition, each sub-fuel bundle assembly comprising at least an 8×8 array of fuel rods extending between upper and lower tie plates; and an inter-bundle support plate receiving a lower end of said channel and having a flow opening at an upper end thereof for each sub-bundle assembly, the lower tie plate of each such sub-fuel bundle assembly supported in a respective one of said openings.

2. The assembly of claim 1 wherein said at least two interior partitions comprise four substantially solid partitions arranged to provide a cruciform passage extending horizontally in mutually perpendicular directions and axially along the length of the channel.

3. The assembly of claim 2 wherein said inter-bundle support plate has a cruciform groove aligned with said cruciform passage, said groove supplied by coolant from at least one coolant supply port.

4. The assembly of claim 1 wherein said inter-bundle support plate is formed with an inlet opening upstream of and common to said four flow openings.

5. The assembly of claim 4 wherein said four flow openings have vertical centerlines offset with respect to a centerline of said inlet opening.

6. The assembly of claim 1 wherein said at least two interior partitions are provided with multiple openings to permit coolant to pass therethrough.

7. The assembly of claim 6 wherein said inter-bundle support plate is formed with a horizontal seating surface adapted to engage a support cup fixed to a reactor core plate.

8. The assembly of claim 1 wherein said channel is substantially square.

9. The assembly of claim 8 wherein each interior partition comprises an angle member having two mutually perpendicular walls engaging adjacent walls of said channel to thereby form said cruciform passage.

10. The assembly of claim 9 wherein said inter-bundle support plate has as cruciform groove aligned with said cruciform passage, said groove in communication with at least one coolant supply port.

11. In a reactor core of a boiling water reactor, a plurality of fuel bundle assemblies each comprising an open ended tubular channel subdivided into four quadrants by at least two interior cross ties, each quadrant having a sub-fuel bundle assembly comprising about sixty-four fuel rods extending between upper and lower tie plates, and wherein any group of four of said fuel bundle assemblies arranged in a square array so as to define a cruciform space separating said tour fuel bundle assemblies from each other has a cruciform control rod located within said cruciform space.

12. The assembly of claim 11 wherein said at least two interior cross ties comprise four elongated, substantially solid partitions arranged to provide cruciform coolant passage extending in mutually perpendicular directions axially of the channel.

13. The assembly of claim 12 wherein said channel and said sub-fuel bundle assemblies are supported on a plate having a cruciform groove aligned with said cruciform passage, said groove provided with at least one coolant supply port.

14. The assembly of claim 13 wherein said plate is formed with individual openings supporting the lower tie plates of the respective sub-fuel bundle assemblies.

15. The assembly of claim 11 wherein said sub-fuel bundle assemblies are supported on a plate having a cruciform groove in which said at least two interior partitions are seated, said interior partitions provided with multiple openings to permit coolant to pass therethrough.

16. The assembly of claim 11 wherein said channel and said sub-fuel bundle assemblies are supported on a plate, said plate having individual openings receiving the lower tie plates of the respective sub-fuel bundle assemblies.

17. The assembly of claim 14 wherein said plate is supported within a cup adapted to be fixed to a core plate of the boiling water nuclear reactor.

18. The assembly of claim 11 wherein said channel is substantially square.

19. The assembly of claim 12 wherein said cruciform coolant passage forms a space between adjacent sub-fuel bundles substantially equal to the space between adjacent channels of said plurality of fuel bundle assemblies.

20. The assembly of claim 12 wherein said coolant passage is provided with a plurality of reinforcement members at spaced intervals along the length of said cross ties.

\* \* \* \* \*